US008066611B2

(12) United States Patent
Spielmann et al.

(10) Patent No.: US 8,066,611 B2
(45) Date of Patent: Nov. 29, 2011

(54) ELECTRICAL TOOL WITH A MULTI-STAGE GEAR TRANSMISSION

(75) Inventors: David Spielmann, Pfaeffikon (CH); Othmar Gerschwiler, Ulisbach (CH); Armin Breitenmoser, Wattwil (CH); Remo Breitenmoser, legal representative, Wattwil (CH)

(73) Assignee: Hilti Aktiengesellschaft, Schaan (LI)

(*) Notice: Subject to any disclaimer, the term of this patent is extended or adjusted under 35 U.S.C. 154(b) by 1065 days.

(21) Appl. No.: 11/980,218

(22) Filed: Oct. 29, 2007

(65) Prior Publication Data

US 2008/0098842 A1 May 1, 2008

(30) Foreign Application Priority Data

Oct. 31, 2006 (DE) ........................ 10 2006 035 386

(51) Int. Cl.
*F16H 3/44* (2006.01)

(52) U.S. Cl. ........................ 475/299; 173/216; 74/473.3

(58) Field of Classification Search .................. 475/298, 475/299; 74/473.3
See application file for complete search history.

(56) References Cited

U.S. PATENT DOCUMENTS 6,860,341 B2 * 3/2005 Spielmann et al. ........... 173/216
* cited by examiner

*Primary Examiner* — David D Le
*Assistant Examiner* — Derek D Knight
(74) *Attorney, Agent, or Firm* — Abelman, Frayne & Schwab

(57) ABSTRACT

An electrical tool includes a multi-stage gear transmission (10) located in the gear transmission housing (6) and having at least two axially displaceable indexing gear (42*a*, 42*b*), a shifting device (12) for shifting the gear transmission from one stage to another stage and having a shifting slide (14) linearly displaceable between different shifting positions, and at least two connection elements (32) for connecting the shifting slide (14) with respective indexing gears (42*a*, 42*b*), with the shifting slide (14) having a tracing profile (20) having two control tracks (22, 24), and the connection elements each having a first and second tracing sections (30*a*, 30*b*) to which the tracing profile (20) applies a shifting force in stages and which are arranged on opposite sides of a pivot axis (SA) of a respective connection element (32).

15 Claims, 4 Drawing Sheets

ELECTRICAL TOOL WITH A MULTI-STAGE GEAR TRANSMISSION

BACKGROUND OF THE INVENTION

1. Field of the Invention

The present invention relates to an electrical tool, in particular a screwdriving or drilling tool, and including a gear transmission housing, and a multi-stage gear transmission located in the gear transmission housing and having at least two axially displaceable indexing gear. The tool is further provided with a shifting device for shifting the gear transmission from one stage to another stage and having a shifting slide linearly displaceable between different shifting positions, and at least two connection elements that connects the shifting slide with respective indexing gears. The shifting slide has a tracing profile for applying a shifting force to the connection elements for pivoting the connection elements in a plurality of predetermined positions corresponding to the gear transmission stages.

2. Description of the Prior Art

In electrical tools of the type described above, the gear transmission can have at least three stages.

German Publication DE 102 22 824 A1 discloses an electrical tool with a multi-stage gear transmission. The tool includes a shifting device having a shifting slide for operating several shifting stirrups which displace respective indexing gears. The shifting stirrup has a pivot support secured to the gear housing and a shifting section extending through a slot formed in the shifting slide. The shifting stirrups have, dependent on the position of the shifting slide, predetermined pivot positions corresponding to predetermined axial positions of the respective indexing gears.

The shifting slide requires, because of control slot formed therein, a certain headroom in the gear transmission housing and because of it, a certain space, which leads to an increase of the heights of the electrical tool in the region of the gear transmission housing.

An object of the present invention is to provide an electrical tool with a multi-stage gear transmission in which the space required by the shifting slide is reduced.

SUMMARY OF THE INVENTION

This and other objects of the present invention, which will become apparent hereinafter, are achieved by providing an electrical tool of the type discussed above and in which, the tracing profile has two control tracks, and the connection elements each has a first tracing section and a second tracing section to which the tracing profile applies a shifting force in stages and which are arranged on opposite sides of a pivot axis of a respective connection element.

The foregoing novel features of the present invention provide, on each of the connection element, a rocker-like region. The rocker-like region enables application to a respective connection element, opposite torques by application of unidirectional shifting forces with a time offset thereto. Thereby, by displacing the shifting slide, the tracing profile can be reciprocated, between different shifting positions, despite an action, in all of the shifting positions, of a one-sides restrain with respect to the shifting forces. This means that shifting between the shifting positions is effected either by pure pressure or by a mere tensioning. Thereby, the shifting slide can be formed as a compact part, without opening and, in particular, without a control slot, and with one of its outer side forming the tracing profile. In this way, the headroom of the shifting slide in the gear transmission housing can be noticeably reduced.

According to a particularly advantageous embodiment of the present invention, the tracing profile is provided on a first, adjacent to the gear transmission, side of the shifting slide.

Thereby, the tracing profile applies pressure to the connection elements. In this way, the head room required for the shifting slide within the gear transmission housing, is essentially determined by the profile depth of the tracing profile and by means for guiding the shifting slide in the gear transmission housing. This permits to reduce the required headroom to a minimum.

Advantageously, the connection elements are formed by shifting stirrups and the tracing sections extend, respectively, transverse to an axial direction. The tracing sections are offset relative to each other in the opposite axial directions with respect to the pivot axis of the respective shifting stirrup. Thereby, the connection elements can be displaced as rockers. As a result, the tracing profile applies a pure pressure to the tracing section on one side of the pivot axis or to the tracing section on the other side of the pivot axis, whereas the tracing profile provides simultaneously a free path for an opposite pivotal movement for a respective another tracing section.

Advantageously, the pivot axis is defined by two, spaced from each other in a direction transverse to the axial direction, support sections of a respective shifting stirrup, rotatably supported in support receptacles provided in the gear transmission housing and secured therein. This insures an exact pivotal movement of the shifting stirrup upon actuation of the shifting device.

Advantageously, the support sections are fixedly secured in the support receptacles. This provides for securing of the connection elements on the gear transmission housing, simplifying the assembly of the tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
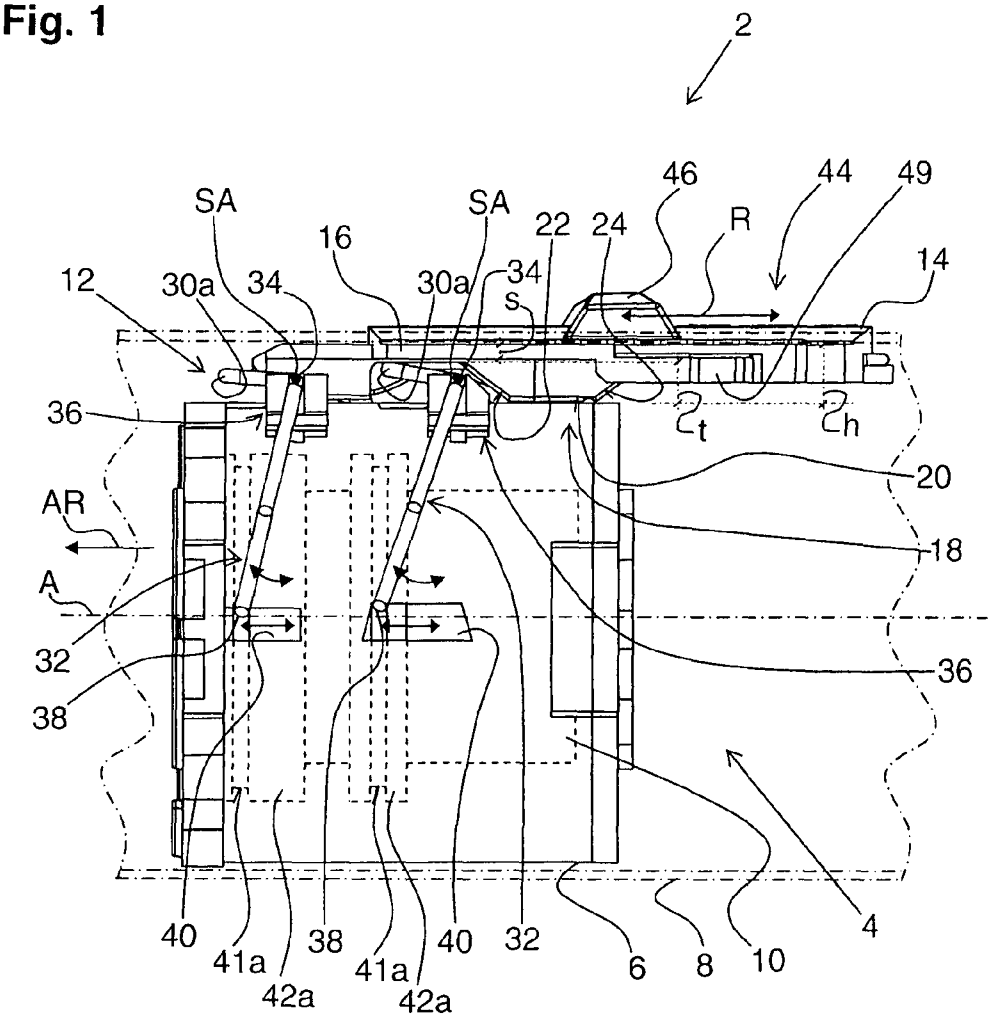
FIG. 1 a schematic view of a driving mechanism of an electrical tool according to the present invention.

FIG. 1 shows, as discussed above, an electrical tool 2 according to the present invention at a height of a gear driving mechanism 4. The electrical tool 2 can be formed as a screwdriving tool or as a drilling tool. The gear driving mechanism 4 has a gear housing 6 arranged in a tool housing 8. A schematically shown, gear transmission 10, which has three shift stages, is located in the gear housing 6.

For shifting the gear transmission 10 between the three shift stages, there is provided a shifting device generally designated with a reference numeral 12. The shifting device 12 has a shifting slide 14 displaceable relative to the tool housing 8 in direction R. The direction R is directed parallel to the operational direction AR along an operational axis A of the electrical tool 2. On the shifting slide 14, there are formed rib-shaped guide means 16 that cooperates with guide counter means, not shown in detail, provided on the tool housing 8.

Figure 2:
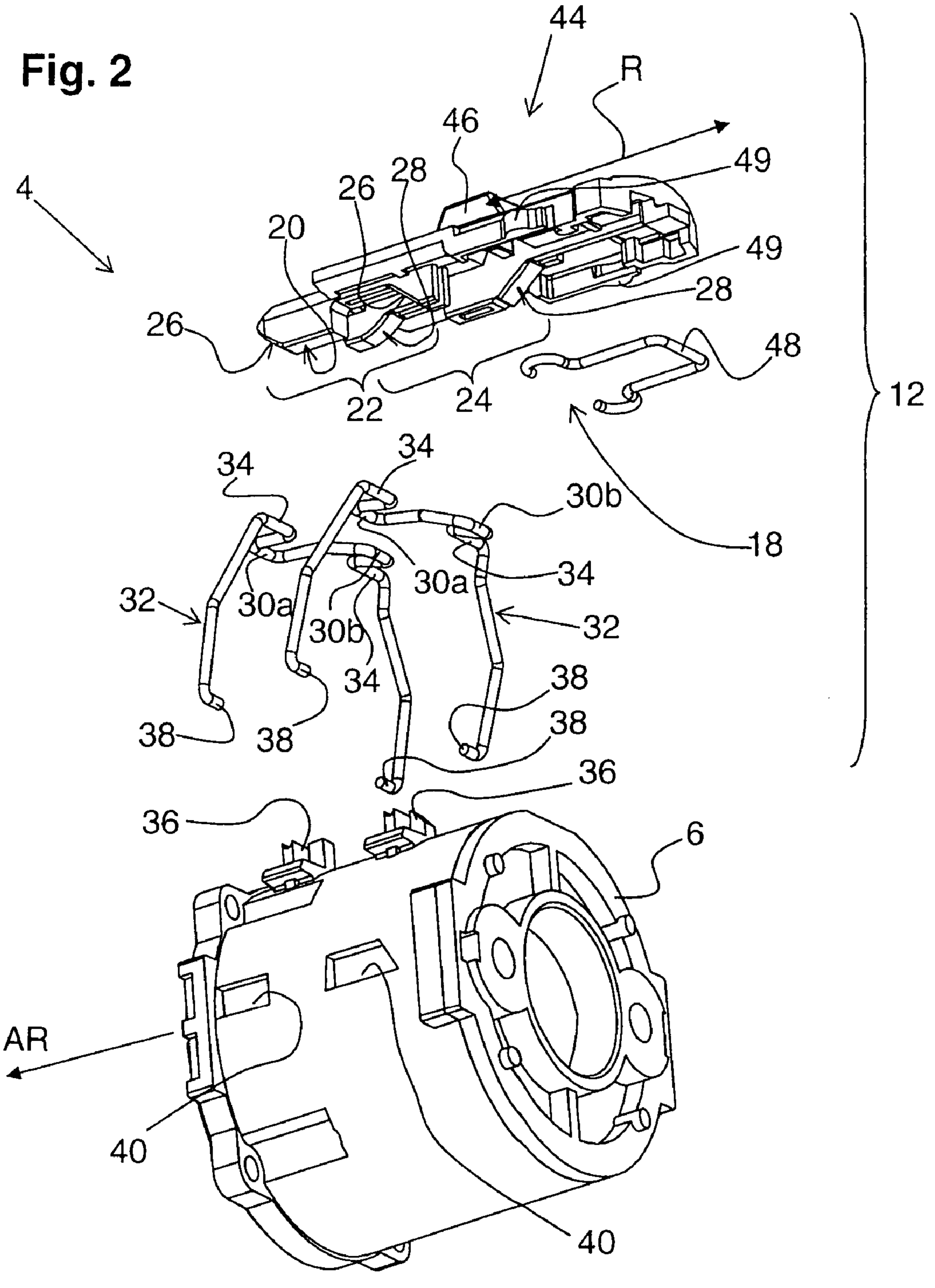
FIG. 2 an exploded perspective view of the driving mechanism according to FIG. 1, as seen at an angle from below.

At its first end 18 adjacent to the gear transmission 10, the shifting slide 14 has, as particularly shown in FIG. 2, a tracing profile 20. The tracing profile 20 is open in the direction of the gear transmission 10, i.e., is directed away from the remaining portion of the shifting slide 14. The tracing profile 20 forms a first control track 22 and a second control track 24, both extending parallel to the axial direction R and forming, section-wise, inclined control surfaces 26, 28. The control surfaces 26 of the first control track 22 face in the operational direction AR, and the control surfaces 28 of the second track 24 face in the direction opposite the operational direction AR.

As shown in FIG. 1, the control tracks 22, 24 abut a first tracing section 30*a* or a second tracing section 30*b* which are formed, respectively, pairwise on two stirrup-shaped connection elements 32. Both connection elements 32 are formed respectively, of a wire that forms, in addition to two tracing sections 30*a*, 30*b*, respectively, two support sections 34, as particularly shown in FIGS. 2-3.

Figure 3:
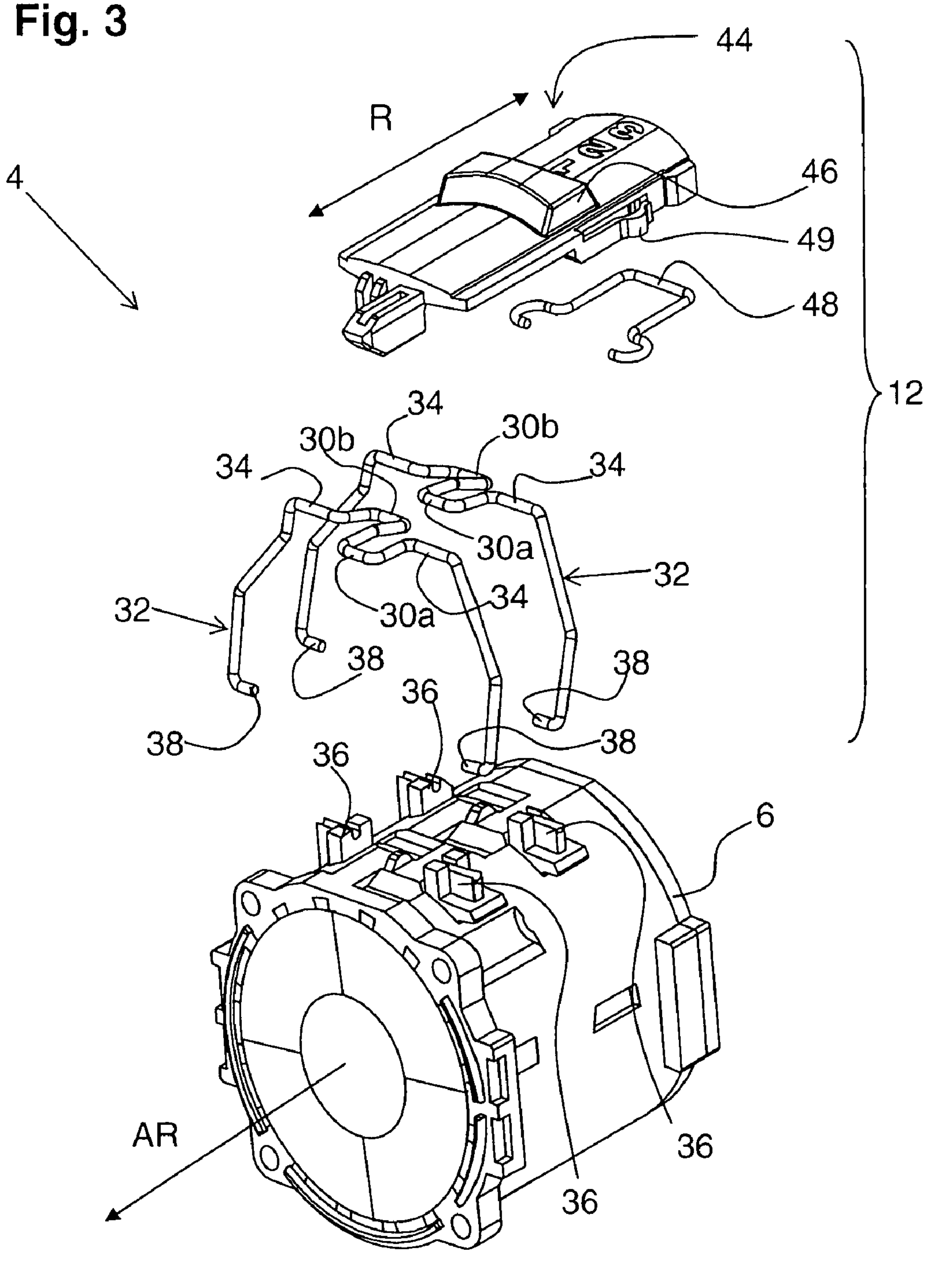
FIG. 3 an exploded perspective view of the driving mechanism according to FIG. 1, as seen at an angle from above.

Both support sections 34 extend transverse to the axial direction R in alignment with each other and engage, respectively, in two support receptacles 36 formed as locking grooves, as particularly shown in FIG. 3. The support receptacles 36 are fixedly connected with the gear housing 6. In this way, the support sections 34 of both connection elements 32, which rotatably engage in support receptacles 36, define, respectively, pivot axes SA, as particularly shown in FIG. 1 and FIGS. 4*a*-4*c*. Both tracing sections 30*a*, 30*b* of the connection elements 32 are located, respectively, on different sides of a plane, not shown in detail, that passes through the respective pivot axes SA and extends transverse to the operational axis A.

As shown in FIGS. 2-3, the connection elements 32 have, at their free ends, respectively, e.g., hook-shaped catch elements 38. With the catch elements 38, each of the connection elements 32 engages through correspondingly arranged through-openings 40 in a first groove 40*a* of a first indexing gear 42*a* or in a second groove 40*b* of a second indexing gear 42*b* of the gear transmission, as shown in FIG. 1.

Both indexing gear 42*a*, 42*b* are displaceable, with respect to the rest of the gear transmission 10, along the axial direction R. Dependent on a position of both indexing gears 42*a*, 42*b*, one of the three shift stages is established.

During operation, only with the shifting device 12, a desired stage of the three shift stages of the gear transmission 10 can be established. To this end, on a second side 44 of the shifting slide 14 remote from the gear transmission 10, a handle 46 is provided with which the shifting device 12 is brought in one of the three shift positions each of which coincides with one of the three shift stages of the gear transmission 10. For an exact positioning of the shifting slide 14 and the shifting device 12 in the desired shifting position, there is provided, on the shifting slide 14, locking hooks 49, which are biased by a locking spring 48, as shown in FIGS. 2-3. In each of the three shifting positions, the locking hooks 49 engage in correspondingly positioned, pairwise locking recesses, which are formed on the tool housing 8.

Figure 4A:
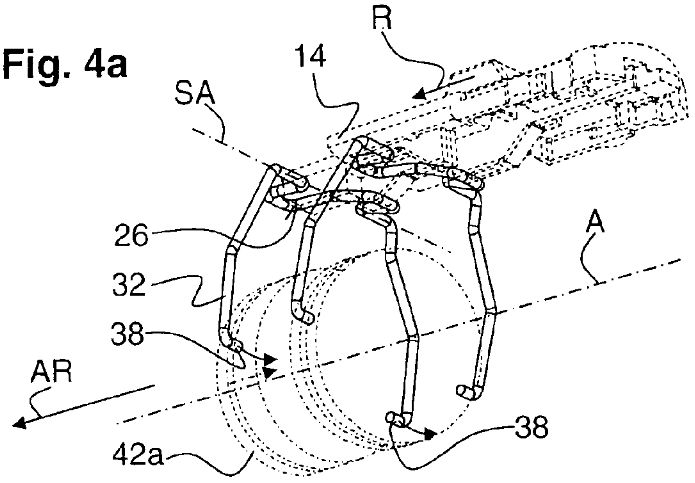
FIG. 4*a* a perspective view of a shifting device of the driving mechanism according to FIG. 1 in a first shifting position.
Figure 4B:
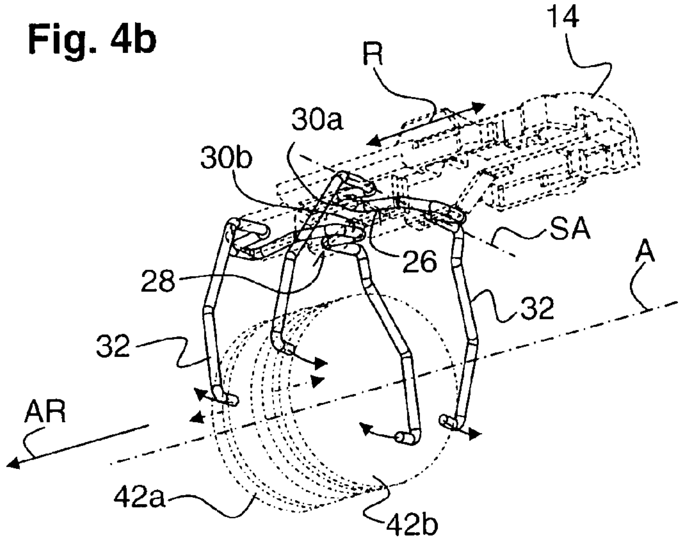
FIG. 4*b* a perspective view of the shifting mechanism according to FIG. 4*a* in a second shifting position.
Figure 4C:
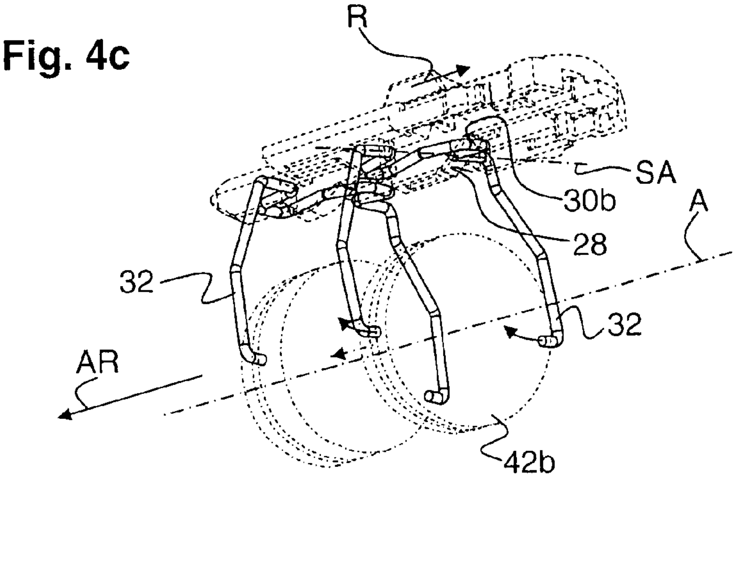
FIG. 4*c* a perspective view of the shifting mechanism according to FIG. 4*a* in a third shifting position.

As shown in FIGS. 4*a*-4*c* with corresponding arrows, upon shifting form an actual shifting position in an adjacent shifting position, at least one of connection elements 32 is pivoted about a respective pivot axis SA by the tracing profile 20 movable in the axial direction R. This results from the fact that of the two tracing sections 30*a*, 30*b* of the corresponding connection element 32 that was up to now further away from the operational axis A, engages with one of the inclined control surfaces 26, 28 upon displacement of the shifting slide 14. In the course of movement, the corresponding tracing section 30*a*, 30*b* is pressed by the control surface 26, 28 in the direction of the operational axis A.

Due to its rocker-shaped profile, the corresponding connection element 32 performs a pivotal movement about the operational axis SA, which pivots the respective other tracing section 30*b*, 30*a*away from the operational axis A. Simultaneously with this movement, both catch elements 38 of the corresponding connection element 32 pivot together therewith, which again results in an axial displacement of the corresponding indexing gear 42*a*, 42*b* in a new shifting position.

Upon shifting from a first shifting position according to FIG. 4*a*, in this way, by displacing the shifting slide 14 in the operational direction AR, it is the front connection element 32 that is biased in the operational direction 32, with its first tracing section 32*a* being pressed in the direction of the operational axis A by the corresponding control surface 26. Thereby, the catch element 38 of the corresponding connection element 32 is pivoted about its pivot axis SA downwardly, whereby the first indexing gear 42*a* is axially displaced in a direction opposite the operational direction AR in a second shifting position according to FIG. 4*b*.

From the second shifting position, the shifting device 12 is displaceable in the first shifting position according to FIG. 4*a* by an opposite displacement of the shifting slide 14. At this shifting, the second tracing section 30*a* of the front connection element 32 is pressed in the direction of the operational axis A by the corresponding control surface 28, and the catch element 38 is pivoted forward in the operational direction AR.

If the shifting slide 14 is displaced from the second shifting position according to FIG. 4*b* further in the operational direction AR, it is the rear, in the operational direction AR, connection element 32 is pressed by the tracing profile 20, whereby the first tracing section 30*a* of the rear connection element 32 is pressed in the direction of the operational axis A by the corresponding control surface 26. Thereby, the catch element 38 of the corresponding connection element 32 pivots out the pivot axis SA of the connection element 32 downwardly, whereby only the second indexing gear 42*b* is displaced in a direction opposite the operational direction AR, which corresponds to the third shifting position according to FIG. 4*c*.

The shifting device 12 is displaced from the third shifting position in the second shifting position according to FIG. 4*b* by an opposite displacement of the shifting slide 14. At this shifting, the second tracing section 30*b* of the rear connection element 32 is pressed in the operational direction AR by the corresponding control surface 28, and the catch element 38 pivots again forward in the operational direction AR.

The rocker-shaped profile of the descried displacement mechanism enables a pure sidewise pressuring of the connection elements 32 by the shifting slide 14. This provides for a very low headroom h of the shifting slide 14 within the tool housing 8 which consists of the profile thickness t of the tracing profile 20 and the thickness s of the guide means, as shown in FIG. 1. Generally, the invention insures a very small constructional space necessary for the shifting device 12 within the tool housing 8.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An electric tool, comprising:

a gear transmission housing (6);

a multi-stage gear transmission (10) located in the gear transmission housing (6) and having at least two axially displaceable indexing gears (42*a*, 42*b*);

a shifting device (12) for shifting the gear transmission (10) from one stage to another stage and having a shifting slide (14) linearly displaceable between different shifting positions;

at least two connection elements (32) for connecting the shifting slide (14) with respective indexing gears (42*a*, 42*b*), wherein the shifting slide (14) has a tracing profile (20) for pivoting the connection elements (32) in a predetermined position and having two control tracks (22, 24), and the connection elements (32) each has a first tracing section (30*a*) and a second tracing section (30*b*) to which the tracing profile (20) of the shifting slide (14) applies a shifting force in stages and which are arranged on opposite sides of a pivot axis (SA) of the respective connection element (32) in a common plane that passes through the pivot axis (AZ).

2. An electric tool according to claim 1, wherein the tracing profile (20) is provided on a first, adjacent to the gear transmission (10), side (18) of the shifting slide (14).

3. An electric tool according to claim 2, wherein the connection elements (32) are formed by shifting stirrups, and the tracing sections (30*a*, 30*b*) extend, respectively, transverse to an axial direction (R).

4. An electrical tool according to claim 3, wherein the pivot axis (SA) is defined by two, spaced from each other in a direction transverse to the axial direction (R), support sections (34) of a respective shifting stirrup, rotatably supported in support receptacles (36) provided in the gear transmission housing and secured therein.

5. An electrical tool according to claim 4, wherein the support sections (34) are fixedly securable in the support receptacles (36).

6. An electric tool, comprising:

a gear transmission housing (6);

a multi-stage gear transmission (10) located in the gear transmission housing (6) and having at least two axially displaceable indexing gears (42*a*, 42*b*);

a shifting device (12) for shifting the gear transmission (10) from one stage to another stage and having a shifting slide (14) linearly displaceable between at least first shifting position and second shifting position; and at least two connection elements (32) for connecting the shifting slide (14) with respective indexing gears (42*a*, 42*b*); and at least two connection elements (32) for connecting the shifting slide (14) with respective indexing gears (42*a*, 42*b*), the connection elements each having a pivot axis (SA), a first tracing section (30*a*) and a second tracing section (30*b*) arranged on opposite sides of the pivot axis (PA), the shifting slide (14) having a tracing profile (20) for pivoting the connection elements (32) about respective pivot axes (SA) thereof upon being displaced to the first and second shifting positions, and the tracing profile (20) having a first control track (22) for applying force to the first tracing section (3*a*) of one of the connection element (32) when the shifting slide (14) is displaced to the first shifting position thereof, and second control track (24) for applying force to the second tracing section (30*b*) of the one of the connection elements (32) when the shifting slide (14) is displaced to the second shifting position thereof.

7. An electric tool according to claim 6, wherein the tracing profile (20) is provided on a first, adjacent to the gear transmission (10), side (18) of the shifting slide (14).

8. An electric tool according to claim 7, wherein the connection elements (32) are formed by shifting stirrups, and the tracing sections (30*a*, 30*b*) extend, respectively, transverse to an axial direction (R).

9. An electrical tool according to claim 8, wherein the pivot axis (SA) is defined by two, spaced from each other in a direction transverse to the axial direction (R), support sections (34) of a respective shifting stirrup, rotatably supported in support receptacles (36) provided in the gear transmission housing and secured therein.

10. An electrical tool according to claim 9, wherein the support sections (34) are fixedly securable in the support receptacles (36).

11. An electric tool, comprising:

a gear transmission housing (6);

a multi-stage gear transmission (10) located in the gear transmission housing (6) and having at least two axially displaceable indexing gears (42*a*, 42*b*);

a shifting device (12) for shifting the gear transmission (10) from one stage to another stage and having a shifting slide (14) linearly displaceable between different shifting positions;

at least two connection elements (32) for connecting the shifting slide (14) with respective indexing gears (42*a*, 42*b*), wherein the shifting slide (14) has a tracing profile (20) for pivoting the connection elements (32) in a predetermined position and having two control tracks (22, 24), and the connection elements (32) each has a first tracing section (30*a*) and a second tracing section (30*b*) arranged on opposite sides of a pivot axis of the respective connection element (32*a*), and the tracing profile (20) of the shifting slide (14) apply a shifting force to one of the first tracing section (30*a*), and the second tracing section (30*b*) of the respective connection element (32) when the shifting slide (14) is displaced to one of the shifting positions thereof and another of the shifting positions thereof, respectively.

12. An electric tool according to claim 11, wherein the tracing profile (20) is provided on a first, adjacent to the gear transmission (10), side (18) of the shifting slide (14).

13. An electric tool according to claim 12, wherein the connection elements (32) are formed by shifting stirrups, and the tracing sections (30*a*, 30*b*) extend, respectively, transverse to an axial direction (R).

14. An electrical tool according to claim 13, wherein the pivot axis (SA) is defined by two, spaced from each other in a direction transverse to the axial direction (R), support sections (34) of a respective shifting stirrup, rotatably supported in support receptacles (36) provided in the gear transmission housing and secured therein.

15. An electrical tool according to claim 14, wherein the support sections (34) are fixedly securable in the support receptacles (36).

* * * * *